(12) United States Patent
Grzywinski et al.

(10) Patent No.: US 8,725,779 B1
(45) Date of Patent: May 13, 2014

(54) SYSTEM AND METHOD FOR COUNTING AND STORING EVENTS AS SCALAR QUANTITIES IN SKEWED COUNTING ENVIRONMENTS

(75) Inventors: Robert Lawrence Grzywinski, Chicago, IL (US); Matthew David Curcio, San Francisco, CA (US)

(73) Assignee: Aggregate Knowledge, Inc., San Mateo, CA (US)

( * ) Notice: Subject to any disclaimer, the term of this patent is extended or adjusted under 35 U.S.C. 154(b) by 0 days.

(21) Appl. No.: 13/465,891

(22) Filed: May 7, 2012

Related U.S. Application Data

(60) Provisional application No. 61/483,566, filed on May 6, 2011.

(51) Int. Cl.
*G06F 17/30* (2006.01)
(52) U.S. Cl.
CPC .............................. *G06F 17/30569* (2013.01)
USPC ......................................................... 707/812

(58) Field of Classification Search
CPC ................................................. G06F 17/30569
USPC ......................................................... 707/812
See application file for complete search history.

(56) References Cited

U.S. PATENT DOCUMENTS

| 2005/0165796 | A1* | 7/2005 | Moore ......................... 707/100 |
| 2007/0033275 | A1* | 2/2007 | Toivonen et al. ............. 709/224 |
| 2011/0196747 | A1* | 8/2011 | Karidi et al. ................ 705/14.71 |

* cited by examiner

*Primary Examiner* — Apu Mofiz
*Assistant Examiner* — Dara J Glasser
(74) *Attorney, Agent, or Firm* — Mahamedi Paradice Kreisman LLP

(57) ABSTRACT

A computer system that includes at least one processor, a first storage resource, and a second storage resource maintains a count of key events. The system determines that the count is not significant and, in response, stores data associated with the key in the second storage resource. The system subsequently can determine when the count has become significant and, in response, stores the data associated with the key in the first storage resource.

20 Claims, 3 Drawing Sheets

SYSTEM AND METHOD FOR COUNTING AND STORING EVENTS AS SCALAR QUANTITIES IN SKEWED COUNTING ENVIRONMENTS

RELATED APPLICATION

This application claims priority to U.S. Provisional Patent Application No. 61/483,566, titled "System and Method for Counting and Storing Events In Highly Skewed Counting Environments," filed May 6, 2011, which is hereby incorporated by reference in its entirety.

TECHNICAL FIELD

The disclosed embodiments relate to the field of counting events as scalar quantities, and more specifically, a system and method for counting and storing events as scalar quantities in skewed counting environments.

BACKGROUND

Computing systems exist that count events and store furthermore, that store data relating to the events. For many online applications, these computer systems usually require large amounts of storage, in order to store an enormous amount of data related to the event counting. Numerous different types of events may be counted, and the counts of individual types of events can be extremely high. For example, millions of types of events may be counted, with some counts running into the billions or trillions.

BRIEF DESCRIPTION OF THE DRAWINGS

The present embodiments are illustrated by way of example and are not intended to be limited by the drawings. Like numbers reference like elements throughout the drawings and specification.

DETAILED DESCRIPTION

Figure 1:
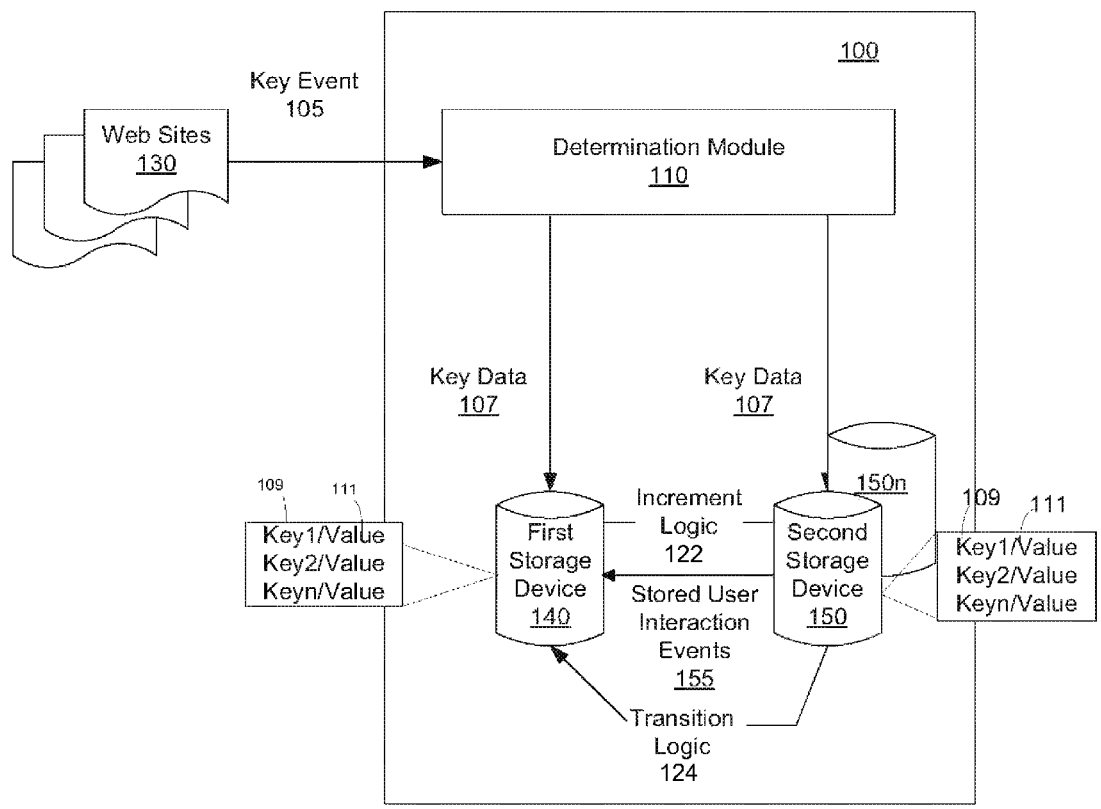
FIG. 1 illustrates a system for counting and storing events in an online environment, according to one or more embodiments.

Embodiments disclosed herein include a system and method for counting and storing event data representing the occurrence of designated events, as well as information related to counted events.

Specific embodiments described herein relate to counting events of various kinds. As used herein, "events" or "designated events" include programmatically generated events, ongoing events (e.g., a milestone such as the passage of time relating to another event), events corresponding to online activities of a population of users, and events that are initiated by end users of an online event (e.g., downloads, clicks, playing media etc.).

With respect to embodiments described herein, the term "key/value pair" means a tuple where the "key" represents the name of the entity and the "value" is the current state of the "key". The term "key" means a unique identifier for a designated type of event or item. A "key" can correspond to, for example, a particular category or demographic over a period of time. A "value," or "key value" (which is intended to be interchangeable with "value") corresponds to, for example, a number of events associated with the key, such as the number of times that a web site was visited by a particular demographic on a particular day or hour of the day. Other examples include a number of instances that an advertisement was delivered with a set number of web pages, or a number of times that a user interacts with a web site or content on the web site such as by clicking, viewing, or positioning a cursor over (e.g., mousing-over) content items. While embodiments described are provided in the context of online environments, other applications and embodiments are applicable to other counting environments, including various non-online applications or environments. The term "key space" means at least one of a collection of all possible combinations of keys for a particular application or domain.

In some embodiments, a count of designated events corresponding to a key is maintained. The key identifies a type of designated event. A key value incorporates a count for designated events associated with that key. The key value can be used to determine a level of significance of the key.

In some embodiments, a determination is made as to whether the key value is significant, based on the count for that key value being in excess of or below a threshold that is deemed significant. In variations, the key value can be deemed significant or insignificant in consideration of other factors or criteria, including pre-designation that events associated with the key are significant.

In other embodiments, a level of significance is determined for a key based on a defined n-tiered significance schema, where n>2. In particular, multiple levels of significance can be defined on criteria that is based at least in part on the count of key events. In one embodiment, the levels of significance can be determined from the count of key events over a designated duration of time. For example, levels of significance can be associated when the count of key events, for a particular key during a given duration of time (e.g., one hour), is 10, 100, 1000 and so forth. In another embodiment, the count of key events for a key can be tiered by thresholds (e.g., events with counts less than 10, less than 100, less than 1000, etc), and/or by time granularity (counting events at the minute level, counting events at the hour level, counting events at the day level). In such embodiments, counts for relatively small units of time (e.g., minute) can be set to have a higher error than those at the hour level. Additionally, the significance levels can be based at least in part, or influenced by, parameters that are not based on count, such as by location of domain count (e.g., U.S. versus Europe). For example, a key can change be significant when it is associated with a particular geographic region.

According to embodiments, the determination of significance/insignificance, or alternatively, level of significance, can determine the lossyness of the memory used to store the count for the particular key. The insignificant, or least significant counts, can be stored with the most lossyness (e.g., compression).

According to an embodiment, in response to a determination that the key value is insignificant, an embodiment provides that data associated with the key is stored in a second storage resource. If a subsequent determination is made that the key value has since become significant (e.g., because of the count for that key value exceeding a threshold at a later time), then the data associated with the key is stored in a first storage resource that is distinct from the second storage resource. Likewise, in variations where multiple levels of significance are employed, the lossyness of the memory which stores the key value pair can be selected based on the significance level of the key. For example, compression formats and/or compression algorithms can be selected based on cost and acceptable lossyness criteria associated with a significance level of the key. In some embodiments, a non-transitory computer-readable storage medium stores instructions that, when executed by at least one processor, cause these operations to be performed.

In variations, the determination of the key value can determine the level of significance the key has, in accordance with an n-tiered significance. The level of significance can determine the storage resource and/or format used to store the key and the count. In particular, less lossy storage resources/formats may be used for more significant keys. In some embodiments, a computer system includes at least one processor and a memory storing instructions that, when executed by the at least one processor, cause the computer system to perform these operations.

In a particular counting environment (e.g., advertisement delivery online), events corresponding to keys are defined and counted. For example, events corresponding to keys can include an advertisement impression, or a user download of a web page (including a unique visit), or a user-interaction (e.g., click, mouse-over, play) with a particular online resource, such as web page content or advertisement. These events are counted, and as events are counted to determine the values for individual keys, the significance of each individual key is monitored. Based on the determination of each key's significance, the key is stored in either an accurate (e.g., highly accurate) storage resource (when the key is more significant) or a less accurate storage resource (when the key is less significant).

In variations, the significance of a key can also be based on factors other than counting. For example, some keys may be associated with events that are always deemed significant. Still further, the significance of a key can be based on determinations of, for example, a geography or demographic.

In some embodiments, key events are counted to determine the value of the individual keys on an ongoing basis, and non-significant keys are monitored to determine if and when they becomes significant. In one embodiment, if the value for a key is stored in the second (low significance) resource and a count associated with the value exceeds a predetermined threshold, the key and its associated value are transferred from the second storage resource to the first storage resource. A determination that the count has exceeded the predetermined threshold indicates that the key and its associated value have become significant.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component can exist in a hardware component independently of other modules/components or a module/component can be a shared element or process of other modules/components, programs or machines. A module or component may reside on one machine, such as on a client or on a server, or may alternatively be distributed among multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system may use memory, processors and network resources (including data ports and signal lines (optical, electrical etc.)), unless stated otherwise.

Furthermore, one or more embodiments described herein may be implemented through the use of instructions that are executable by one or more processors. These instructions may be carried on a non-transitory computer-readable medium. Machines shown in figures below provide examples of processing resources and non-transitory computer-readable mediums on which instructions for implementing one or more embodiments can be executed and/or carried. For example, a machine shown for one or more embodiments includes processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, and network-enabled devices (e.g. portable devices such as cell phones) are all examples of machines and devices that use processors, memory, and instructions stored on computer-readable mediums.

FIG. 1 illustrates a system for implementing counting for keys in a skewed counting environment, according to one or more embodiments. In a skewed counting environment, the events that are being counted can be identified by keys that have a highly skewed distribution. In a skewed environment, some events hare highly more prevail ant that other events. For example, some evens can be of several orders of magnitude more frequent than other events. Thus, the value associated with some keys can be several orders of magnitude more than the value of other keys.

As will be discussed herein, system 100 tracks, counts, and stores data relating to an enormous number of events. More specifically, system 100 counts and tracks possible combinations of keys (counted events) in the key space to determine data that is relevant to a particular context (e.g. an advertiser). A system such as described by an embodiment of FIG. 1 may be implemented on, for example, a server or combination of servers, such as on a combination of servers that provide a network service. According to some embodiments, a system such as described by FIG. 1 may be implemented as a network service for use by, for example, advertisers.

In many skewed counting environments, there can be a plethora of keys, of which many (e.g. a substantial majority) are deemed not significant as a result of the key value (or as a result of the count being less than a threshold for determining significance). However, an online environment is dynamic, and embodiments recognize that previously insignificant keys can suddenly become significant. Accordingly, system 100 is adapted to monitor keys while maintaining counts under classifications of insignificant or significant, or alternatively different levels of significance. Furthermore, system 100 can maintain counts for individual keys and then migrate individual keys from insignificant or less significant classification levels to significant or more significant classification levels. The migration of keys from, for example, insignificant to significant, can be based on, for example, a threshold count or key value that signifies the change in significance classification.

Due to the sheer number of items being counted, it is sometimes impractical to accurately store data of each key/value pair in the key space. Rather, embodiments recognize that data deemed to be significant should be stored accurately. Embodiments further recognize that insignificant data, on the other hand, can be stored in a manner that is less precise and cumbersome to resources. For example, insignificant event data can be stored in a lossy compressed format and/or device, where the potential for error (e.g., relatively large but bounded error) exists.

As mentioned, counting environments are dynamic and insignificant data can become significant (or more significant) over time, sometimes suddenly. According to some embodiments, system 100 is configured to store the insignificant data in a manner that allows the data to be used should it become significant. When a key is migrated from insignificance to significance, data from a key's insignificant past can be set to be sufficiently coarse to be within a margin of accuracy when accuracy is mandated by subsequent significance.

In certain embodiments, system 100 is configured to detect or otherwise receive data that identifies the occurrence of key events. For example, the events 105 can be generated, or otherwise detected, by programmatic interaction with a plurality of web sites 130 that are defined as part of a common key space.

As discussed above, system 100 is configured to track and maintain counts associated with various possible key events and key combinations. In a particular environment, the count associated with a key can tally to billions or trillions or even more, while the number of keys that compose the key space can be millions or more. In such an environment, it is impractical to store data associated with respective keys equally, given the amount of data that would be needed to maintain the accuracy of keys that are deemed significant. In a given key space, many (e.g., most) of the keys are insignificant in count.

According to an embodiment, system 100 includes a determination module 110, increment logic 122, a first storage resource 140, and a second storage resource 150. In some embodiments, the system 100 includes one or more intermediate storage resources 150n. Additionally, the system 100 can include a subscriber interface, which enables a user (e.g., an advertiser) to specify a code that triggers a key event 105.

Each storage resource 140, 150, 150n can correspond to, for example, a separate device, storage environment, or partition within a common environment. In certain embodiments, the first storage resource 140 uses lossless compression, and is assumed to provide a most accurate of storing data. The second storage resource 150 can use lossy compression, thereby storing data less accurately, but requiring fewer resources. Additional storage resources 150n can utilize alternative storage resources and/or compression to provide, for example, an intermediate level of lossyness. With some embodiments, as assumption may be made that the more lossless the compression or storage resource, the more costly the storage resource. According to embodiments, each storage resource 140, 150 stores a set 115 of keys 109 and corresponding key values 111, where the key values represent a count of the number of instances in which the corresponding event occurred. The storage resource in which an individual key is stored can mark the significance level of the particular key, at least in a point in time that is just prior to the key value of the key being increased with the occurrence of a corresponding key event.

According to an embodiment, the user can interact with the system 100 to define a key (e.g., a particular advertisement) and to receive a code element or trigger that can be reproduced or distributed on user resources in order to generate corresponding key events. For example, the code element can be provided for inclusion in a corresponding online advertisement media, and set to trigger when that advertisement media is served. In this way, each impression can trigger a key event 105. According to embodiments, a plethora of key events 105 are received, and each key event identifies a corresponding key.

When the key event 105 is received, the determination module 110 (i) makes the determination of the significance of the key identified by the key event, and (ii) records the instance of the key event in the appropriate storage resource (e.g., as determined by the significance or significance level of the event). In an embodiment, the determination module 110 determines the significance of the key by checking one or more of the storage resources 140, 150, 150n. In particular, an embodiment provides that the determination module 150 responds to the key event by checking the data resource for the least significant resource in order to determine whether the key is associated with the particular significance level. In an implementation in which the significance level of the event can be either significant or insignificant, the determination module 110 checks the second data source 150 (for the insignificant events) for the key event. If the key is stored with the insignificant data source 150, then the determination module 110 increments the key value (e.g., using the increment logic 122), and checks the key value against the criterion for significant, in order to determine if the key has transitioned in significance. If the key has transitioned in significance, then transition logic 124 (e.g., provided with the determination module 110) copies the key value pair to the first data resource 140, marking the significance of the key.

In the case of multi-tiered significance levels, one or more intermediate storage resources 150n are used. An embodiment provides that the determination of significance starts with determining whether the key of the key event 105 resides with the least significant data resources 140. The determination module 110 progressively checks more significant (or intermediate) data resources 150n until the key of the key event is identified. When the key of the key event is located, the increment logic 122 increments the key value. The determination module 110 compares the new value to the key value criteria for the next level of significance. If the criteria for the transition is met, then transition logic 124 moves the value pair to the storage resource of the next level of significance.

In response, the determination module 110 stores data that records the instance of the key event 105. This can correspond to identifying a key value increment 107 for the key of the key event 105. In one embodiment, if the key is significant, then the key value increment 107 is stored in the first storage resource 140, which can correspond to a lossless or most accurate storage environment for keys in system 100. However, if the key is potentially not significant, then the key event data is stored in another data storage resource that can include a greater amount of error (e.g., more lossy, greater compression etc.).

As noted, the key value 111 of individual keys 109 can be used to determine the significance level of that key. A key 109 can transition from insignificant to significant or from a lesser significance level to a more significant level, in response to the key value 111 for that key being incremented to predetermined criteria for establishing a significance level. The increment logic 122 increments the key value 111, and the determination module 110 determines when the incremented key 109 is to transition significance levels based on the corresponding key value 111. A key 109 can be re-classified in significance if a count or significance criteria is met with the occurrence of a corresponding key event 105, and the key value increment in the corresponding key value 111. For example, a key value 111 can meet the predetermined criteria to transition they key 109 from insignificant to significant, or from one level of significance to a higher level of significance, after the occurrence of a key event.

In an embodiment, the determination module 110 maintains keys in the lossy compressed medium of second storage resource 150, unless criteria is met for transitioning the key to the first storage resource 140 (for significant/insignificant classification), or to one of the intermediate storage resources 150n (for multi-tiered significance levels). With the intermediate or additional levels of significance, some embodiments provide for the key event 105 to be stored in the storage medium 150n, providing intermediate-level lossy error, and to be transitioned to storage resources 150n that are associated with more significant keys. Optionally, the storage resources 150n can be less lossy, or progressively less lossy in relation to their assigned level of significance.

Methodology

Figure 2:
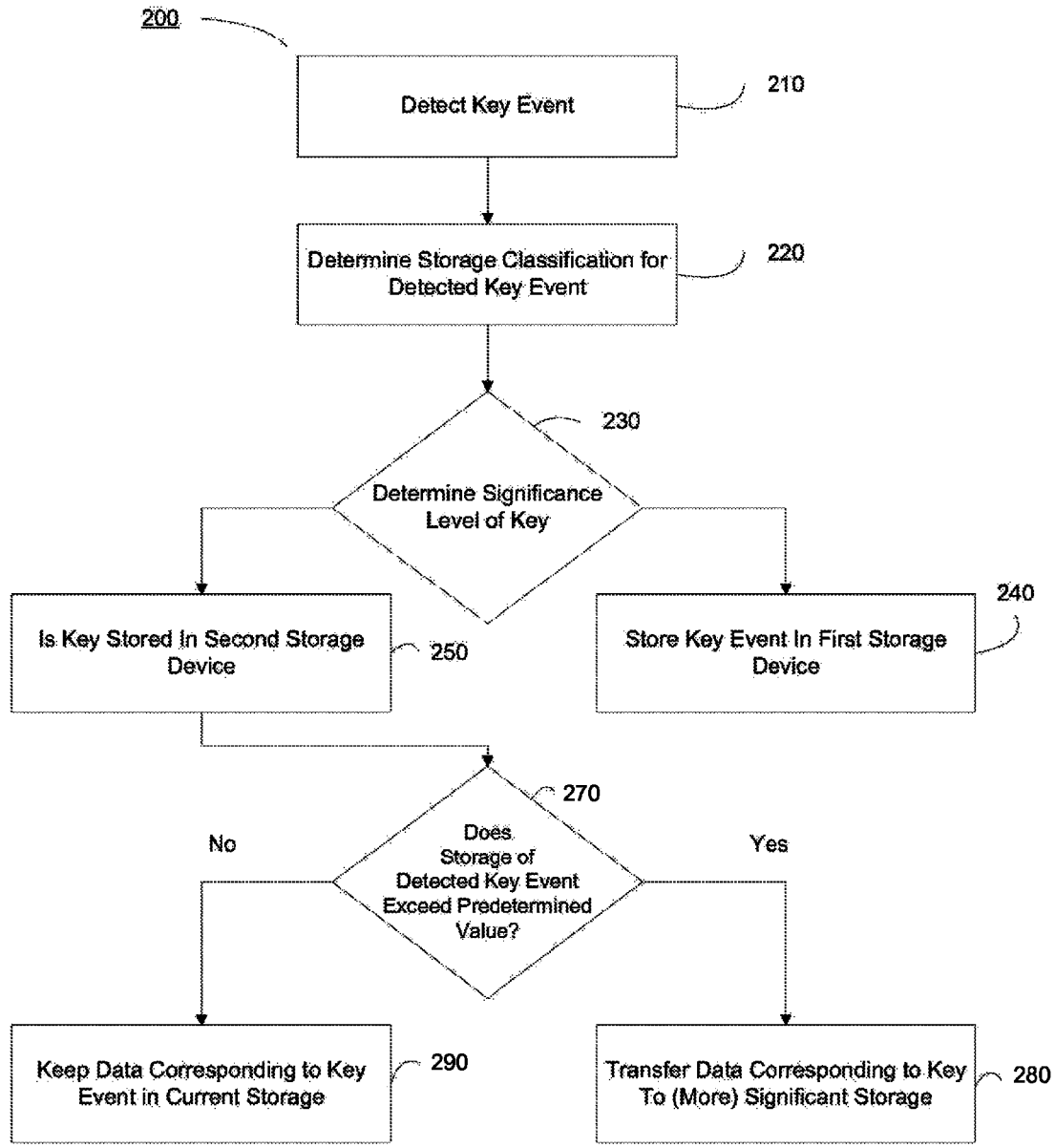
FIG. 2 is a flow chart illustrating a method for counting and storing events in an online environment, according to one or more embodiments.

FIG. 2 is a flow chart illustrating a method 200 for detecting and storing user interaction events and maintaining key/value pairs according to one or more embodiments. A method 200 may be used in conjunction with system 100 such as described above with respect to FIG. 1. Therefore, the following description may refer to one or more components described with respect to FIG. 1. However, any such reference to the components of FIG. 1 is for descriptive purposes only.

Method 200 begins when a key event, such as, for example, key event 105 (FIG. 1) associated with a particular key/value pair is detected and/or received 210.

Once the user interaction event 155 is detected, a determination is made as to the significance classification of the event (220). In one embodiment, the significance classification of the event corresponds to that of either significant or insignificant. In another embodiment, the significance classification is associated with a significance level of a tiered schema (e.g., not significant, less significant, more significant, and most significant). The classification of the significance of the event determines where and/or how data corresponding to the event is stored. In certain embodiments, this determination may be made by determination module 110 (FIG. 1). For example, the determination module 110 may determine, in response to a key event and based on certain storage requirements, whether the key/value pair should be stored in a storage resource using lossless compression or whether the user interaction event 155 should be stored in a storage resource using lossy compression.

With reference to an example of FIG. 1, the key is classified as being significant, when the key/value pair is stored in the first storage resource 140. In another embodiment, the key/value pair is only stored in the first storage resource 140 when a count associated with the key event exceeds a predetermined value.

According to an embodiment, if it is determined that the key is significant and/or the key event has already been stored in the first storage resource (230—Yes), the key/value pair is stored in the first (accurate) storage resource (240). Previous storage of the key event in the first storage resource indicates that the key previously was determined to be significant. A count associated with the key is incremented (240).

When the determination is made that the key and/or detected key event are not significant (230—No), the key/value pair is stored in, for example, second storage resource 150 (FIG. 1) (250). In some embodiments, the determination module 110 may check the second data source 150 first, to determine if the key is provided there with the insignificant classification. In variations, the determination module 110 may check the least significant data source 150, 150n in progression until the key/value pair is identified. Still further, the data resources 140, 150, 150n can be checked if the key event has not previously been stored in the first storage resource 140, and/or if the first data resource 140 was checked for the key/value pair. In updating the key/value pair, a count for the key value is incremented and stored (250).

Once the key event data has been stored, a determination is made as to whether the count associated with the particular key (when classified as not significant) exceeds a predetermined value (270). Such determination may include calculating whether the count for the key has exceeded a designated threshold.

In the tiered schema, the determination can optionally be made as to a lossyness of the key/value pair that is to be stored. For example, the key and key value can be stored using a storage component with an associated lossyness parameter that is based on the significance level of the key.

Optionally, if the key value meets or exceeds the designated threshold (270—Yes), some implementations provide for the key/value pair to be transferred from the second storage resource to the first storage resource (280). In variations, the designated threshold can be for one predetermined level of significance, and the key value pair can be transferred from one of the storage resources 150, 150n to another of the storage resources 150n, 140 based on the criteria for higher significance level being met. Thereafter, data corresponding to the additional key events are stored in the storage resource 150n, 140 where the key/value pair reside.

If however, it is determined that the key value does not meet or exceed the predetermined value (270—No), the key/value pair remains stored in the same storage resource (290). Optionally, the key value can be incremented.

While the method 200 includes a number of operations that appear to occur in a specific order, it should be apparent that the method 200 can include more or fewer operations, some of which can be executed serially or in parallel. An order of two or more operations may be changed and two or more operations may be combined into a single operation.

Computer System

Figure 3:
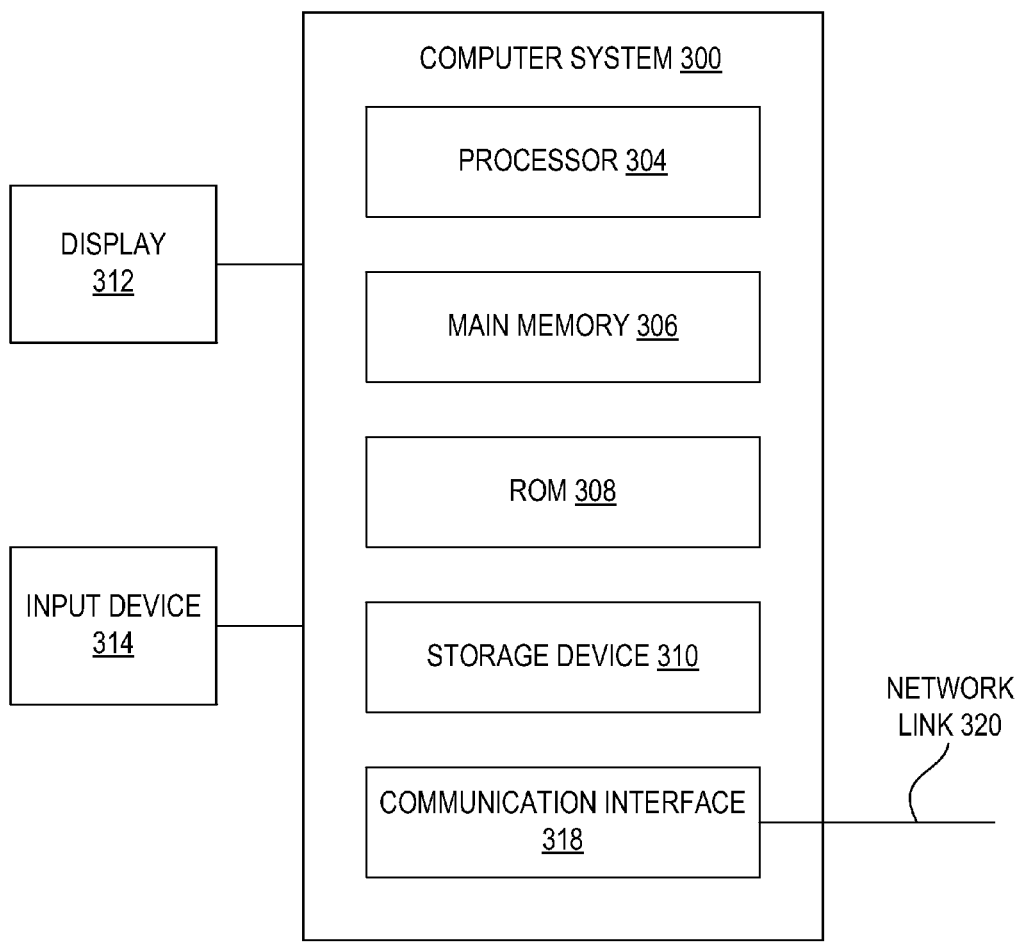
FIG. 3 is a block diagram that illustrates a computer system in which one or more embodiments described herein may be implemented.

In some embodiments, one or more components of the system 100 (FIG. 1) may be implemented on or using a computer system. FIG. 3 is a block diagram that illustrates a computer system 300 upon which one or more embodiments may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, or a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments disclosed herein may include any number of input devices 314 coupled to computer system 300.

In one or more embodiments, computer system 300 is used to implement the techniques described herein. According to one embodiment, those techniques are performed by computer system 300 in response to processor 304 executing one or more sequences of one or more instructions contained in main memory 306. Such instructions may be read into main memory 306 from another machine-readable medium, such as storage device 310. Storage device 310 is an example of a non-transitory computer-readable storage medium. Execution of the sequences of instructions contained in main memory 306 causes processor 304 to perform the process steps described herein (e.g., the method 200, FIG. 2). In alternative embodiments, hard-wired circuitry may be used in place of or in combination with software instructions to implement some embodiments. Thus, embodiments disclosed herein are not limited to any specific combination of hardware circuitry and software.

The term "machine-readable storage medium" as used herein refers to any medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, a hard disk, magnetic tape, any other magnetic medium, a CD-ROM, any other optical medium, a RAM, a PROM, an EPROM, a FLASH memory, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320, and communication interface 318. For example, a server might transmit a requested code for an application program through the Internet, a local ISP, a local network, and subsequently to communication interface 318. The received code may be executed by processor 304 as it is received, and/or stored in storage device 310, or other non-volatile storage for later execution.

CONCLUSION

It is contemplated for embodiments described herein to extend to individual elements and concepts described herein, independently of other concepts, ideas or systems, as well as for embodiments to include combinations of elements recited anywhere in this application. Although illustrative embodiments have been described in detail herein with reference to the accompanying drawings, it is to be understood that the disclosure is not limited to those precise embodiments. As such, many modifications and variations will be apparent to practitioners skilled in this art. Accordingly, it is intended that the scope of the disclosure be defined by the following claims and their equivalents. Furthermore, it is contemplated that a particular feature described either individually or as part of an embodiment can be combined with other individually described features, or parts of other embodiments, even if the other features and embodiments make no mention of the particular feature. This, the absence of describing combinations should not preclude the inventor from claiming rights to such combinations.

What is claimed is:

1. A method performed by a computer system comprising at least one processor, the method comprising:
   defining a plurality of keys, each of the plurality of keys being associated with a key event that is defined at least in part by an occurrence of a user activity;
   monitoring activity of a population of users;
   determining, from monitoring activity of the population of users, a count of the key event for each key;
   determining a significance level of each key in the plurality of keys based at least in part on the count for the key event of each key in the plurality of keys, wherein at least some keys are determined to be significant based on the count for the associated key event exceeding a threshold, and wherein a majority of the plurality of keys are determined to be insignificant based on the count for the associated key event being less than the threshold;
   storing a data set for each key based on the determined significance level of that key, each data set including the key and the count for the key event of that key;
   wherein storing the data set includes storing the data set of keys that are determined to be significant in a first memory, and the data set of keys that are determined to be insignificant in a second memory, the first memory being more lossless than the second memory;
   monitoring the count of the key events for at least the keys that are determined to be insignificant in order to determine when the count for the key event of a given key exceeds the threshold; and
   in response to determining that the count for the key event of the given key exceeds the threshold, storing the data set for the given key in the first memory, and setting the count for the key event to be within a predetermined margin of accuracy.

2. The method of claim 1, wherein determining the significance level is based at least in part on exceeding a predetermined value for a given time period.

3. The method of claim 1, wherein the second memory uses lossy compression.

4. The method of claim 3, wherein the first memory uses lossless compression.

5. The method of claim 1, wherein the key event comprises one of i) a click, ii) an impression, iii) a conversion event, iv) a unique visit, or v) a combination thereof.

6. The method of claim 1, wherein determining comprises determining a significance level of each key in the plurality of keys comprises determining that the data associated with the key is not stored in the first memory.

7. The method of claim 1, wherein determining the significance level includes determining that the key has an intermediate level of significance in between an insignificant level and a most significant level.

8. The method of claim 7, wherein storing data includes using a memory or resource that is associated with the intermediate level of significance, and not associated with the insignificant level or the most significant level.

9. A computer system, comprising:
one or more processors; and
a memory storing instructions that, when executed by the at least one processor, cause the one or more processors to:
define a plurality of keys, each of the plurality of keys being associated with a key event that is defined at least in part by an occurrence of a user activity;
monitor activity of a population of users;
determine, from monitoring activity of the population of users, a count of the key event for each key;
determine a significance level of each key in the plurality of keys based at least in part on the count for the key event of each key in the plurality of keys, wherein at least some keys are determined to be significant based on the count for the associated key event exceeding a threshold, and wherein a majority of the plurality of keys are determined to be insignificant based on the count for the associated key event being less than the threshold;
store a data set for each key based on the determined significance level of that key, each data set including the key and the count for the key event of that key;
wherein storing the data set includes storing the data set of keys that are determined to be significant in a first memory, and the data set of keys that are determined to be insignificant in a second memory, the first memory being more lossless than the second memory;
monitor the count of the key events for at least the keys that are determined to be insignificant in order to determine when the count for the key event of a given key exceeds the threshold; and
in response to determining that the count for the key event of the given key exceeds the threshold, storing the data set for the given key in the first memory, and setting the count for the key event to be within a predetermined margin of accuracy.

10. The computer system of claim 9, wherein the instructions to determine whether the count is significant comprise instructions to determine whether the count exceeds a predetermined value.

11. The computer system of claim 9, wherein:
the instructions to store the data associated with the key in the second memory comprise instructions to store the data using lossy compression; and
the instructions to store the data associated with the key in the first memory comprise instructions to store the data using lossless compression.

12. The computer system of claim 9, further comprising instructions for determining that the key has an intermediate level of significance in between an insignificant level and a most significant level.

13. The computer system of claim 12, wherein storing data includes using a storage format or memory that is associated with the intermediate level of significance, and not associated with the insignificant level or the most significant level.

14. A non-transitory computer-readable medium that stores instructions, which when executed by one or more processors, cause the one or more processors to perform operations comprising:
defining a plurality of keys, each of the plurality of keys being associated with a key event that is defined at least in part by an occurrence of a user activity;
monitoring activity of a population of users;
determining, from monitoring activity of the population of users, a count of the key event for each key;
determining a significance level of each key in the plurality of keys based at least in part on the count for the key event of each key in the plurality of keys, wherein at least some keys are determined to be significant based on the count for the associated key event exceeding a threshold, and wherein a majority of the plurality of keys are determined to be insignificant based on the count for the associated key event being less than the threshold;
storing a data set for each key based on the determined significance level of that key, each data set including the key and the count for the key event of that key;
wherein storing the data set includes storing the data set of keys that are determined to be significant in a first memory, and the data set of keys that are determined to be insignificant in a second memory, the first memory being more lossless than the second memory;
monitoring the count of the key events for at least the keys that are determined to be insignificant in order to determine when the count for the key event of a given key exceeds the threshold; and
in response to determining that the count for the key event of the given key exceeds the threshold, storing the data set for the given key in the first memory, and setting the count for the key event to be within a predetermined margin of accuracy.

15. The non-transitory computer-readable medium of claim 14, wherein determining the significance level is based at least in part on exceeding a predetermined value for a given time period.

16. The non-transitory computer-readable medium of claim 14, wherein the second memory uses lossy compression.

17. The non-transitory computer-readable medium of claim 16, wherein the first memory uses lossless compression.

18. The non-transitory computer-readable medium of claim 14, wherein the key event comprises one of i) a click, ii) an impression, iii) a conversion event, iv) a unique visit, or v) a combination thereof.

19. The non-transitory computer-readable medium of claim 14, wherein determining a significance level of each key in the plurality of keys comprises determining that the data associated with the key is not stored in the first memory.

20. The non-transitory computer-readable medium of claim 14, wherein determining the significance level includes determining that the key has an intermediate level of significance in between an insignificant level and a most significant level.

* * * * *